United States Patent
Boenapalli et al.

(10) Patent No.: US 10,769,079 B2
(45) Date of Patent: Sep. 8, 2020

(54) EFFECTIVE GEAR-SHIFTING BY QUEUE BASED IMPLEMENTATION

(71) Applicant: QUALCOMM Incorporated, San Diego, CA (US)

(72) Inventors: Madhu Yashwanth Boenapalli, Hyderabad (IN); Venu Madhav Mokkapati, Hyderabad (IN); Surendra Paravada, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 31 days.

(21) Appl. No.: 15/937,814

(22) Filed: Mar. 27, 2018

(65) Prior Publication Data

US 2019/0303313 A1    Oct. 3, 2019

(51) Int. Cl.
*G06F 13/16* (2006.01)
*G06F 13/42* (2006.01)

(52) U.S. Cl.
CPC ...... *G06F 13/1668* (2013.01); *G06F 13/1642* (2013.01); *G06F 13/4282* (2013.01)

(58) Field of Classification Search
CPC .... G06F 3/0625; G06F 3/0661; G06F 3/0659; G06R 29/0273
See application file for complete search history.

(56) References Cited

U.S. PATENT DOCUMENTS

| | | | |
|---|---|---|---|
| 8,359,486 B2 | 1/2013 | Huang et al. | |
| 9,477,620 B2 | 10/2016 | Kim et al. | |
| 9,563,260 B2 | 2/2017 | Wagh et al. | |
| 2010/0238904 A1* | 9/2010 | Zhang | H04L 5/0023 370/333 |
| 2011/0211479 A1* | 9/2011 | Sala | H04L 12/2801 370/252 |
| 2014/0006670 A1* | 1/2014 | Wagh | G06F 13/4027 710/305 |
| 2014/0281108 A1* | 9/2014 | Pethe | G06F 13/4027 710/313 |
| 2015/0081956 A1* | 3/2015 | Vucinic | G06F 5/10 711/103 |
| 2015/0113333 A1 | 4/2015 | Kim | |
| 2015/0301763 A1* | 10/2015 | Shaharabany | G06F 3/0613 711/115 |
| 2015/0309752 A1* | 10/2015 | Ellis | G06F 3/0625 711/103 |
| 2017/0249104 A1* | 8/2017 | Moon | G06F 13/37 |

(Continued)

*Primary Examiner* — Getente A Yimer
(74) *Attorney, Agent, or Firm* — Muncy, Geissler, Olds & Lowe, P.C.

(57) ABSTRACT

In a conventional system with a UFS storage device connected to a UFS host over one or more lanes, the lanes can support different transmission speeds, referred to as gears. The UFS host shifts lanes and gears based on the type of request it receives. When the requests arrive in random order of gear requirements, the frequent shifting of the lanes and gears causes significant power consumption. To address this issue, it is proposed to implement a queue-based shifting in which arriving requests may be queued based on their gear requirements. When a queue is selected, multiple requests in the selected queue, which are all of same or similar gear requirement, can be served. This can reduce the frequency of gear shifting, and hence reduce power consumption.

38 Claims, 5 Drawing Sheets

(56) References Cited

U.S. PATENT DOCUMENTS

2017/0286357 A1    10/2017  Chellappan et al.
2018/0059159 A1*   3/2018   Hsu .................... G01R 29/0273
2018/0321864 A1*   11/2018  Benisty ................ G06F 3/0625

* cited by examiner

EFFECTIVE GEAR-SHIFTING BY QUEUE BASED IMPLEMENTATION

FIELD OF DISCLOSURE

One or more aspects of the present disclosure generally relate to memory systems, and in particular, to support effective gear-shifting when accessing storage devices such as embedded UFS (Universal Flash Storage) devices and removable UFS cards.

BACKGROUND

JEDEC (Joint Electron Device Engineering Council) promulgates several standards including the UFS standard for high performance mobile storage devices. The UFS has adopted MIPI (Mobile Industry Processor Interface) for data transfer in mobile systems. The UFS is a standard to provide high-performance serial interface for moving data between a host and a storage device.

UFS is well-suited for mobile applications (e.g., mobile phones, laptop computers, handheld devices, tablets, etc.) where high performance demands are seen in conjunction with low power consumption requirements. A UFS memory system may be an embedded device within a host such as a processor or an SoC (System-on-Chip), and/or may be integrated on a removable card, for flexible use with different hosts. Different standards and configurations may be applicable to the available UFS memory systems.

UFS memory systems and their interfaces to the hosts may include multiple layers to support the standards. The host may include an HCI (Host Controller Interface) and a UTP (UFS Transport Protocol) as defined in the JEDEC standard. The host may also include a Unipro (Unified Protocol) and a physical interface referred to as M-PHY (Mobile-PHYsical-Layer) as defined by MIPI. Within the host, the Unipro and the M-PHY are designed to communicate through an interface or bus referred to as an RMMI (Reference M-PHY Module Interface), which is also defined in MIPI.

A UFS memory system which communicates with the host may also include counterpart layers, UTP, Unipro, and M-PHY. Each M-PHY supports a specific number of bits or pins, referred to in units of lanes. A lane is a high speed serial interface targeting 2.9 Gbits per second per lane with up-scalability to 5.8 Gbits per second per lane. UFS 2.0 defines three high speed gears—HS-G1, HS-G2, HS-G3—with each gear having different transmission speeds.

Depending on the particular implementation, each UFS device may support one or more lanes. For example, an embedded UFS device supports two lanes with all three gears in each lane. An external UFS card is typically a removable device, and supports a single lane of memory traffic in all three gears.

A conventional host controller shifts gears based on the type of request it receives. For example, the host controller switches to G3 (gear 3) for large data transfers, to G2 for moderate data transfers, and to G1 for small data transfers. When there are continuous data transfers on the embedded UFS memory and the external UFS card one after the other, the lanes and gears must also shift one after the other. Also, if the I/O (input/output) requests arrive in random order of gear requirement, the frequent shifting of the lanes and gears can cause significant power consumption.

SUMMARY

This summary identifies features of some example aspects, and is not an exclusive or exhaustive description of the disclosed subject matter. Whether features or aspects are included in, or omitted from this summary is not intended as indicative of relative importance of such features. Additional features and aspects are described, and will become apparent to persons skilled in the art upon reading the following detailed description and viewing the drawings that form a part thereof.

An exemplary apparatus is disclosed. The apparatus may comprise a host configured to access a storage device over a connection. The host may comprise a host PHY, a plurality of queues, and a request controller configured to interface with the host PHY. The host PHY may be configured to communicate with the storage device over the connection in one of a plurality of communication modes. Each communication mode may be different from all other communication modes. The plurality of queues may correspond to the communication modes applicable to the connection. The request controller may be configured to receive a plurality of requests targeting the storage device. The request controller may also be configured to determine a communication mode of each request, and send each request to the queue corresponding to the communication mode of that request. The request controller may further be configured to select a queue based on a number of requests in each queue, and provide the requests of the selected queue to the host PHY for transmission of the provided requests to the storage device by the host PHY over the connection.

Another exemplary apparatus is disclosed. The apparatus may comprise a storage device, a host, and a connection configured to couple the storage device with the host. The host may comprise a host PHY, a plurality of queues, and a request controller configured to interface with the host PHY. The host PHY may be configured to communicate with the storage device over the connection in one of a plurality of communication modes. Each communication mode may be different from all other communication modes. The plurality of queues may correspond to the communication modes applicable to the connection. The request controller may be configured to receive a plurality of requests targeting the storage device. The request controller may also be configured to determine a communication mode of each request, and send each request to the queue corresponding to the communication mode of that request. The request controller may further be configured to select a queue based on a number of requests in each queue, and provide the requests of the selected queue to the host PHY for transmission of the provided requests to the storage device by the host PHY over the connection.

An exemplary method of an apparatus is disclosed. The apparatus may comprise a host configured to access a storage device over a connection. The host may comprise a plurality of queues corresponding to a plurality of communication modes applicable to the connection. The method may comprise acts performed by a request controller of the host. The acts performed by the request controller may include receiving a plurality of requests targeting the storage device, determining a communication mode of each request, sending each request to the queue corresponding to the communication mode of that request, selecting a queue based on a number of requests in each queue, and providing the requests of the selected queue to a host PHY of the host for transmission of the provided requests to the storage device by the host PHY over the connection.

Yet another exemplary apparatus is disclosed. The apparatus may comprise a host configured to access a storage device over a connection. The host may comprise a host PHY, a plurality of queues, and a request controller configured to interface with the host PHY. The host PHY may be configured to communicate with the storage device over the connection in one of a plurality of communication modes. Each communication mode may be different from all other communication modes. The plurality of queues may correspond to the communication modes applicable to the connection. The request controller may comprise means for receiving a plurality of requests targeting the storage device, means for determining a communication mode of each request, means for sending each request to the queue corresponding to the communication mode of that request, means for selecting a queue based on a number of requests in each queue, and means for providing the requests of the selected queue to the host PHY for transmission of the provided requests to the storage device by the host PHY over the connection.

BRIEF DESCRIPTION OF THE DRAWINGS

The accompanying drawings are presented to aid in the description of examples of one or more aspects of the disclosed subject matter and are provided solely for illustration of the examples and not limitation thereof.

DETAILED DESCRIPTION

Aspects of the subject matter are provided in the following description and related drawings directed to specific examples of the disclosed subject matter. Alternates may be devised without departing from the scope of the disclosed subject matter. Additionally, well-known elements will not be described in detail or will be omitted so as not to obscure the relevant details.

The word "exemplary" is used herein to mean "serving as an example, instance, or illustration." Any embodiment described herein as "exemplary" is not necessarily to be construed as preferred or advantageous over other embodiments. Likewise, the term "embodiments" does not require that all embodiments of the disclosed subject matter include the discussed feature, advantage or mode of operation.

The terminology used herein is for the purpose of describing particular examples only and is not intended to be limiting. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, processes, operations, elements, and/or components, but do not preclude the presence or addition of one or more other features, integers, processes, operations, elements, components, and/or groups thereof.

Further, many examples are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer-readable storage medium having stored therein a corresponding set of computer instructions that upon execution would cause an associated processor to perform the functionality described herein. Thus, the various aspects may be embodied in a number of different forms, all of which have been contemplated to be within the scope of the claimed subject matter. In addition, for each of the examples described herein, the corresponding form of any such examples may be described herein as, for example, "logic configured to" perform the described action.

Figure 1:
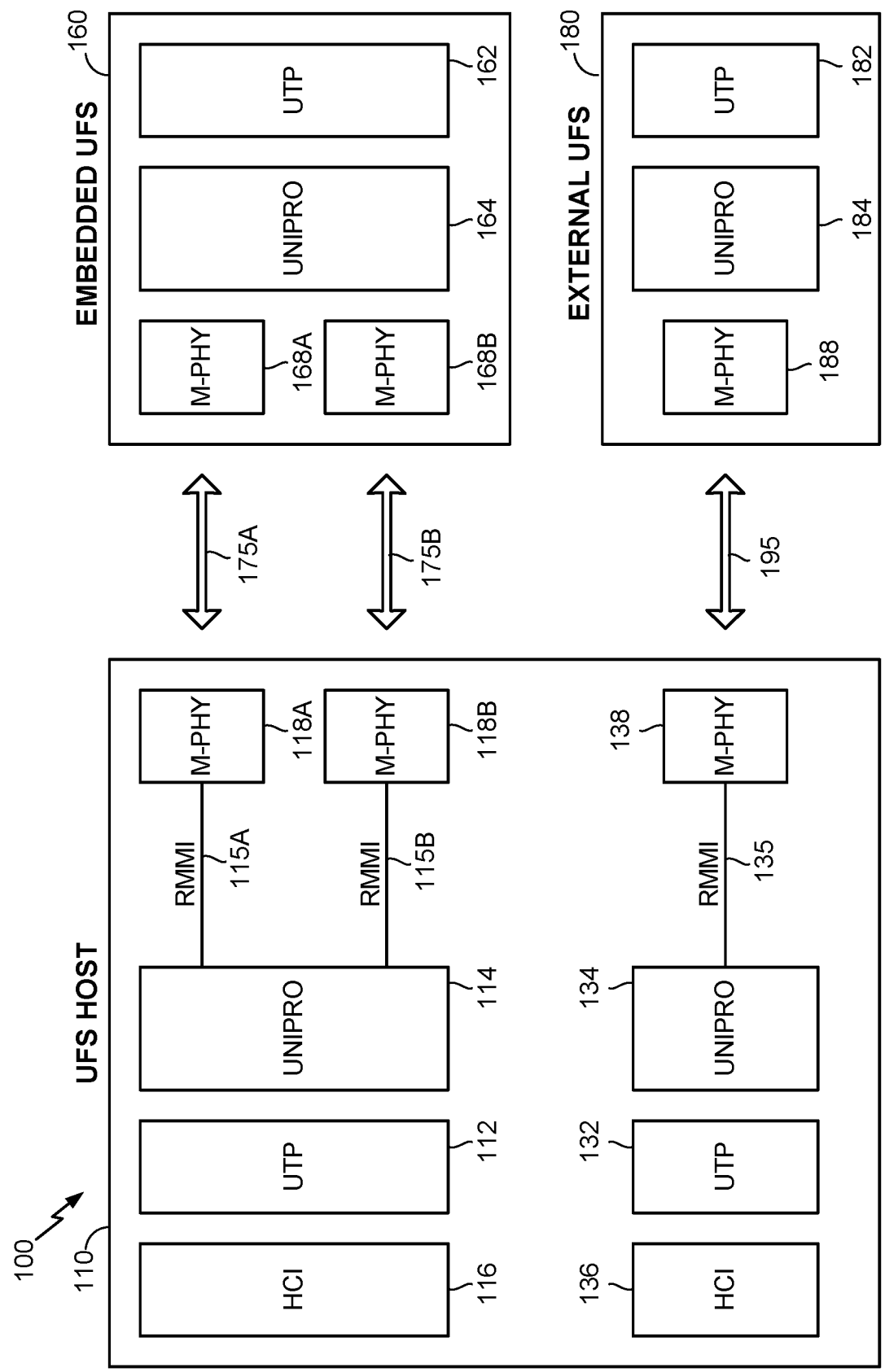
FIG. 1 illustrates an existing UFS system.

Recall from above that one disadvantage (of which there can be several) of an existing UFS system is the significant power consumption due in large part to the frequent gear shifting for transferring data between the UFS host and the UFS storage devices. FIG. 1 illustrates a conventional UFS system 100 that includes a UFS host 110 connected to a 2-lane embedded UFS device 160 via lanes 175A, 175B. The UFS host 110 is also connected to a 1-lane external UFS card 180 via a lane 195.

The embedded UFS device 160 includes M-PHY interfaces 168A, 168B that communicate with the UFS host 110 over the lanes 175A, 175B, respectively. The embedded UFS device 160 also includes a Unipro 164 and a UTP 162. The Unipro 164 and the UTP 162 together with the M-PHY interfaces 168A, 168B support communication with the UFS host 110 over the lanes 175A, 175B.

The external UFS card 180 includes an M-PHY interface 188 configured to communicate with the UFS host 110 over the lane 195. The external UFS card 180 also includes a Unipro 184 and a UTP 182. The Unipro 184 and the UTP 182 together with the M-PHY interface 188 support communication with the UFS host 110 over the lane 195.

The UFS host 110 includes a group of components that operate together to access the embedded UFS device 160. This "embedded" group comprises an HCI 116, a UTP 112, a Unipro 114, and M-PHY interfaces 118A, 118B. In the embedded group, RMMIs 115A, 115B are coupled between the Unipro 114 and the M-PHY interfaces 118A, 118B. The M-PHY interfaces 118A, 118B communicate with the embedded UFS device 160 over the lanes 175A, 175B, respectively.

The UFS host 110 also includes a group of components that operate together to access the external UFS card 180. This "external" group comprises an HCI 136, a UTP 132, a Unipro 134, and an M-PHY interface 138. An RMMI 135 is coupled between the Unipro 134 and the M-PHY interface 138. The M-PHY interface 138 communicates with the external UFS card 180 over the lane 195.

The following discussion will focus on the embedded group of components. The HCI 116 interfaces with a host processor (not shown) to access the embedded UFS device 160 for reads and writes. In response to demands from the processor, the HCI 116 issues corresponding requests (e.g., reads/writes) that generate traffic targeting the embedded UFS device 160. The UTP 112 and the Unipro 114 provide the requests received from the HCI 116 to the M-PHY interfaces 118A, 118B, which in turn transmit the requests to the embedded UFS device 160 over the lanes 175A, 175B.

Note that the speed requirements of different requests from the HCI 116 can be different. When the speed requirements of successive requests are different, then the gear of the lanes 175A, 175B must be shifted accordingly. For example, one or both of the M-PHY interfaces 118A, 118B may need to shift their configuration from operating in HS-G1 to operate in HS-G2. Since the speed requirements of the requests can be random, this can cause frequent shifting of the gears. The frequent gear shifting can result in increased power consumption when accessing the embedded UFS device 160.

Similarly, frequent gear shifting of the lane 195 can also occur since speed requirements of requests to access the external UFS card 180 are also random. It is then seen that the conventional UFS system 100 can suffer from excessive power consumption due to high frequency of gear shifting on all of the lanes 175A, 175B, and 195.

Figure 2:
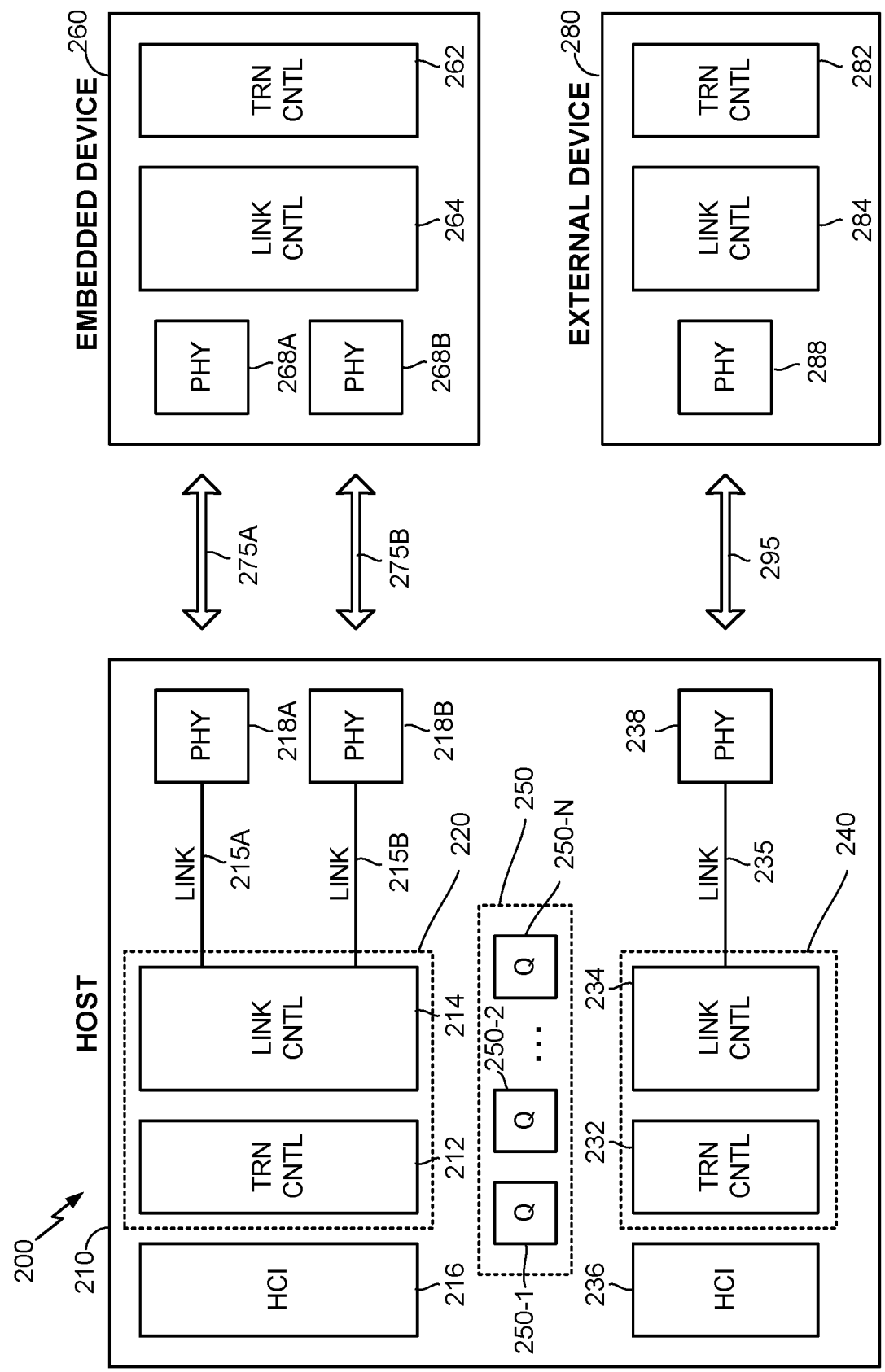
FIG. 2 illustrates an apparatus with a host configured to communicate with one or more storage devices.

FIG. 2 illustrates an example of an apparatus 200 that addresses some or all issues related to conventional data storage systems such as the UFS system 100. In particular, the apparatus 200 can reduce the gear shifting frequencies, while preventing service starvation.

The apparatus 200 may include a host 210, which may be configured to communicate with a storage device 260 over lanes 275A, 275B. For ease of reference, the term "connection" will be used to refer to a collection of lanes that couple a same pair of devices for communication. The lanes 275A, 275B may then be collectively referred to as the connection 275, and the host 210 may be viewed as being configured to communicate with the storage device 260 over the connection 275.

The host 210 may also be configured to communicate with a storage device 280 over a lane 295. Using the definition of the connection as indicated above, the lane 295 may also be referred to as the connection 295. Then the host 210 may be viewed as being configured to communicate with the storage device 280 over the connection 295.

While two storage devices 260, 280 are illustrated, this is not a requirement. It is contemplated that the host 210 may communicate with any number of—i.e., one or more—storage devices over the corresponding one or more connections. Also, each connection may comprise one or more lanes coupling the host 210 with the corresponding storage device.

When desirable, terms "first" and "second" will be used to refer to those aspects of the apparatus 200 that are respectively associated with the storage device 260 and with the storage device 280. The host 210 may then be viewed as being configured to communicate with the first storage device 260 over the first connection 275 (comprising the first lanes 275A, 275B), and may also be viewed as being configured to communicate with the second storage device 280 over the second connection 295 (comprising the second lane 295).

The first storage device 260 may be a UFS (Universal Flash Storage) device. In an aspect, the first storage device 260 may be an embedded storage device. That is, the first storage device 260 may be integrated with the host 210 such that the two are not physically separable from each other. The first storage device 260 may comprise one or more first device PHY interfaces 268A, 268B configured to communicate with the host 210 over the first lanes 275A, 275B, respectively. For ease of reference, the first device PHY interfaces 268A, 268B may collectively be referred to as the first device PHY 268. Then the first device PHY 268 (of the first storage device 260) can be viewed as being configured to communicate with the host 210 over the first connection 275.

The second storage device 280 may also be a UFS device. In an aspect, the second storage device 280 may be an external storage card removable from the host 210. The second storage device 280 may comprise a second device PHY interface 288 configured to communicate with the host 210 over the second lane 295. The second device PHY interface 288 may also be referred to as the second device PHY 288. Then the second device PHY 288 (of the second storage device 280) can be viewed as being configured to communicate with the host 210 over the second connection 295.

Note that the first device PHY 268 includes two first device PHY interfaces 268A, 268B corresponding to the two first lanes 275A, 275B. Also note that the second device PHY 288 includes one second device PHY interface 288 corresponding to the one second lane 295. Broadly, it can be said that for each storage device of the apparatus 200, a device PHY of that storage device may comprise a number of device PHY interfaces equal to a number of lanes of a corresponding connection. In an aspect, one or both of the first device PHY 268 and the second device PHY 288 may operate in compliance with M-PHY (Mobile-PHYsical-Layer). That is, one or both of the first device PHY interfaces 268A, 268B and the second device PHY interface 288 may operate in compliance with M-PHY.

The first storage device 260 may also comprise a first device link controller 264 and a first device transport controller 262. Similarly, the second storage device 280 may also comprise a second device link controller 284 and a second device transport controller 282. In an aspect, one or both of the first and second device link controllers 264, 284 may operate in compliance with Unipro (Unified Protocol). In another aspect, one or both of the first and second device transport controllers 262, 282 may operate in compliance with UTP (UFS Transport Protocol).

Generally, for each storage device, the host 210 (e.g., a processor or an SoC (System-on-Chip)) may comprise a host group of components that operate together to access that storage device. That is, in FIG. 2, the host 210 may comprise a "first" host group of components that operate together to access the first storage device 260. The host 210 may also comprise a "second" host group of components that operate together to access the second storage device 280. In general, the number of host groups may be any integer 1 or more.

The first host group may include first host PHY interfaces 218A, 218B, a first link controller 214, and a first transport controller 212. The first host PHY interfaces 218A, 218B may be configured to communicate with the first storage device 260 over the first lanes 275A, 275B, respectively. For ease of reference, the first host PHY interfaces 218A, 218B may collectively be referred to as the first host PHY 218. In other words, the host 210 may comprise a first host PHY 218 configured to communicate with the first storage device 260 over the first connection 275. In an aspect, the first host PHY 218, i.e., one or both of the first host PHY interfaces 218A, 218B, may be configured to operate in compliance with M-PHY. The number of first host PHY interfaces 218A, 218B that make up the first host PHY 218 may equal the number of the lanes 275A, 275B of the first connection 275.

The first link controller 214 may be configured to interface with the first host PHY 218 over one or more first links 215A, 215B (collectively referred to as the first host link 215). The first host link 215, i.e., the first links 215A, 215B, may be configured to operate in compliance with RMMI (Reference M-PHY Module Interface). Also, the first link controller 214 may operate in compliance with Unipro.

The first transport controller 212 may be configured to interface with the first link controller 214 and to receive one or more requests from a first HCI (Host Controller Interface) 216. In an aspect, the first transport controller 212 may be configured to operate in compliance with UTP. For example, the first transport controller 212 may receive UCS (UFS Command Set Layer) commands from the first HCI 216.

The second host group may comprise a second host PHY 238 (comprising a single second host PHY interface 238), a second link controller 234, and a second transport controller 232. The second host PHY 238 may be configured to communicate with the second storage device 280 over the second connection 295; the second link controller 234 may be configured to interface with the second host PHY 238 over the second host link 235 (comprising a single second host link 235); and the second transport controller 232 may be configured to interface with the second link controller 234 and to receive one or more requests from a second HCI 236.

Generally, each host group of the host 210 may comprise a host PHY (comprising one or more host PHY interfaces) configured to communicate with a storage device over a connection (comprising one or more lanes). The host PHY may operate in compliance with M-PHY. The host group may also comprise a link controller configured to interface with the host PHY over a host link (comprising one or more links). The link controller may operate in compliance with Unipro and the host link may operate in compliance with RMMI. The host group may further comprise a transport controller configured to interface with the link controller and to receive one or more requests from an HCI. The transport controller may operate in compliance with UTP.

In FIG. 2, the components of different host groups are illustrated as being separate. For example, the first HCI 216, the first transport controller 212, and the first link controller 214 are illustrated as being separate from the second HCI 236, the second transport controller 232, and the second link controller 234. However, this is not a requirement. It is contemplated that the components among the host groups may be physically integrated. For example, the first and second HCIs 216, 236 may be implemented in a single physical device. It is also contemplated that multiple components within a host group may also be integrated. For example, the first transport controller 212 and the first link controller 214 may be integrated. In general, any number of components may be integrated. Thus, FIG. 2 may be said to illustrate a logical view.

For each host group, there may be a corresponding request controller. The request controller may comprise one or both of the link controller and the transport controller of the host group. For example, in FIG. 2, a first request controller 220 is illustrated as including one or both of the first link controller 214 and the first transport controller 212 (indicated as a dashed box). Similarly, a second request controller 240 is illustrated as including one or both of the second link controller 234 and the second transport controller 232.

Regardless of the number of the host groups, the host 210 may further comprise a plurality of queues 250-1, 250-2, . . . 250-N (singularly or collectively referred to as queue(s) 250). The queues 250 may be implemented in a variety of ways such as through registers and/or locations in a memory. In an aspect, the request controllers may utilize the queues 250 to reduce the frequency of gear shifting. In an aspect, each host group may manage its own queues. That is, in FIG. 2, the plurality of queues 250 may include a first plurality of queues 250 and a second plurality of queues 250.

The following discussion will focus on the first host group to reduce the frequency of gear shifting when accessing the first storage device 260. But it will be seen that the discussion will be readily applicable to other host groups including the second host group. In this discussion, it will be assumed that the first connection 275 can be operated in three gears in order from the slowest to the fastest—HS-G1, HS-G2, and HS-G3. More generally, the three gears may represent three different communication modes and may be associated with three different transfer speeds. In this instance, three queues—Q1, Q2, Q3—corresponding to the three communication modes applicable to the first connection 275 may be utilized for the first storage device 260. Each of the queues Q1, Q2, Q3 may be one of the queues 250-$k$, $k=1$ . . . N.

In an aspect, the first request controller 220 may reduce the gear shifting frequency with a following process:

Queue each arriving request into one of the queues based on the gear of the request;

When scheduling starts, i.e., at queue selection time:

Compare the number of requests in each queue;

Select a queue Qx with a highest number of requests;

Service the requests in the selected queue;

Repeat.

An example scenario will be described for illustration purposes. In this scenario, it is assumed that the first request controller 220 has queued four low speed requests in Q1, three moderate speed requests in Q2, and two high speed requests in Q3 (see Table 1).

TABLE 1

| L3 | L2 | L1 | L0 | Q1 for HS-G1 |
|---|---|---|---|---|
|  | M2 | M1 | M0 | Q2 for HS-G2 |
|  |  | H1 | H0 | Q3 for HS-G3 |

According to the described process, when the scheduling starts, Q1 will be selected first, Q2 will be selected second, and Q3 will be selected last. When Q1 is selected, it may be necessary to shift the gear of the first connection 275 to service the first request L0 in Q1. However, there will be no need for gear shifting to service the remaining requests L1, L2, and L3 since these are of the same speed. Similarly, when Q2 is selected, gear shifting may be necessary to service the first request M0. However, gear shifting will not be necessary to service the remaining requests M1 and M2. Finally, when Q3 is selected, gear shifting may be necessary to service the request H0, but will not be necessary to service H1. As a result, the frequency of gear shifting can be reduced.

Blindly servicing the requests in the selected queue may lead to an undesirable situation in which other queues are starved for service. For example, in the above scenario, while the requests L0, L1, L2, and L3 of Q1 are being served, other low speed requests (e.g., L4, L5, etc.) can enter Q1. If these subsequent requests are also served, then Q2 and/or Q3 can be starved for service.

In an aspect, the above-described process may be modified as follows to prevent starvation due to requests entering the selected queue after the queue is selected (i.e., subsequent to the queue selection time):

Queue each arriving request into one of the queues based on the gear of the request;

When scheduling starts, i.e., at queue selection time:

Compare the number of requests in each queue;

Select a queue Qx with a highest number of requests;

Service the requests in the selected queue:

Do not serve the requests that enter the selected queue subsequent to the queue selection time;

Repeat.

In the scenario described above, requests L0, L1, L2, and L3 are within Q1 at the queue selection time when Q1 is selected. If the modified process is applied, then the requests L0, L1, L2, and L3 may be served. However, the subsequently entering requests (e.g., L4, L5, etc.) will not be served in the current servicing round. Once the requests L0, L1, L2, and L3 are served, then in the next queue selection time, Q2 may be selected.

Starvation may also occur if the queue with the highest number of requests is always selected at each queue selection time. For example, it is possible that while the requests L0, L1, L2, and L3 are being served, requests L4, L5, L6, and L7 enter Q1. If there are no changes to Q2 and Q3, then in the next queue selection time, Q1 may be selected again since it has the most number of requests.

To address such starvation scenario, the process may be further modified as follows:

Queue each arriving request into one of the queues based on the gear of the request;
When scheduling starts, i.e., at queue selection time:
Compare the number of requests in each queue;
Select a queue Qx with a highest number of requests;
Qx remains selected if all other queues with requests have been serviced at least once between Qx's prior selection and the current queue selection time;
If not, select the next best queue with the highest number of requests;
Service the requests in the selected queue:
Do not serve the requests that enter the selected que subsequent to the queue selection time;
Repeat.

Under this modified process, Q1 will be initially selected at queue selection time since it has the most number of requests. Q1 will remain selected if both Q2 and Q3 have been selected for service since that last time Q1 was selected. If not, Q2 will be selected since it has the next most number of requests, and will remain selected if Q3 has been selected for service since the last time Q2 was selected. Otherwise, Q3 will be selected.

Regardless of the transfer speeds, the requests may also be prioritized. For example, each normal request may be tagged as P1 (priority-1) and each high-priority request may be tagged as P2 (priority-2). In an aspect, any of the above-described processes may be implemented when there are no P2 requests. That is, if any of the queues include one or more P2 requests, then the queues with the P2 requests may be served. Once the queues with the P2 requests have been served, the above-described processes may be implemented.

Figure 3:
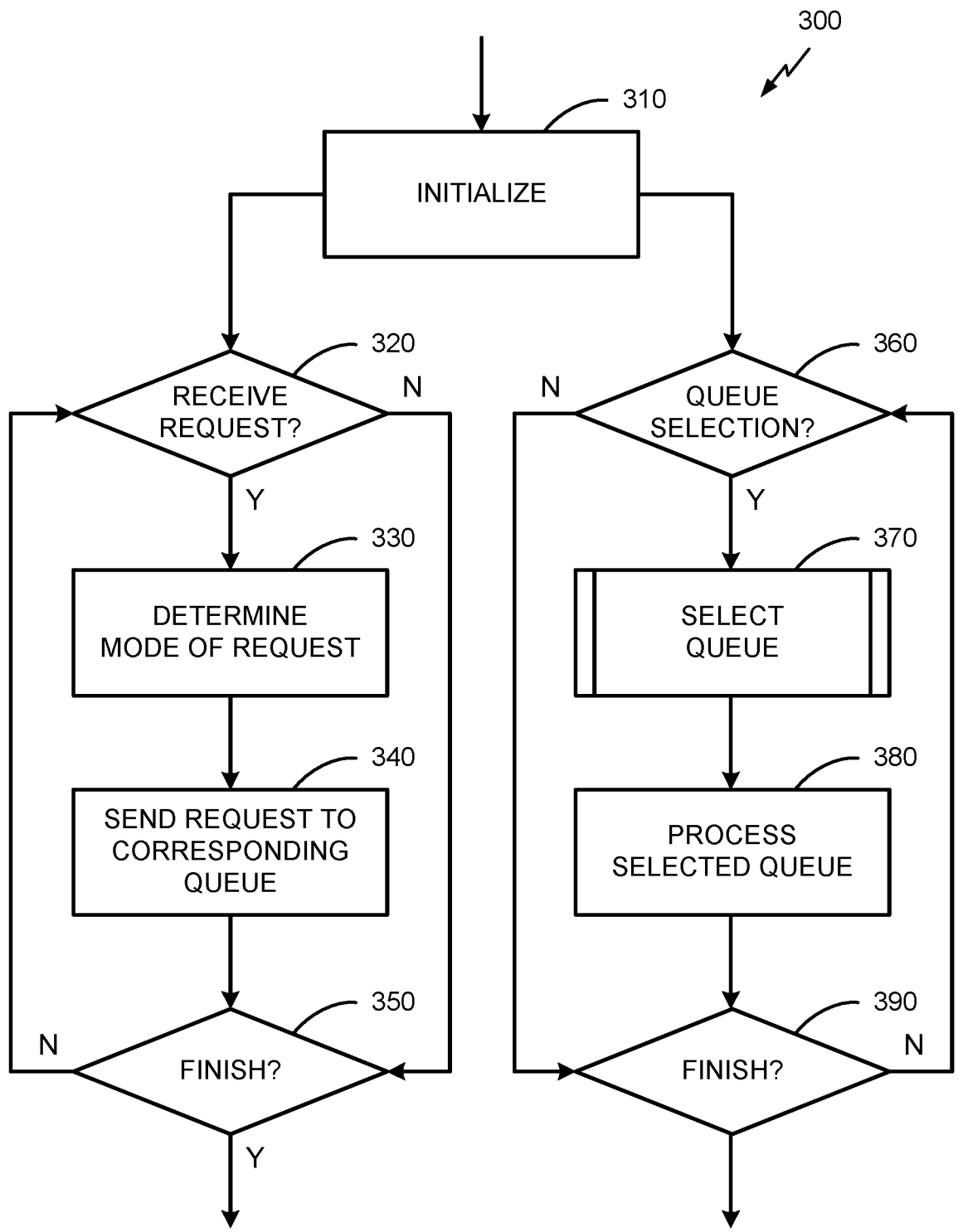
FIG. 3 illustrates a flow chart of an example method performed by a host of an apparatus.
Figure 4:
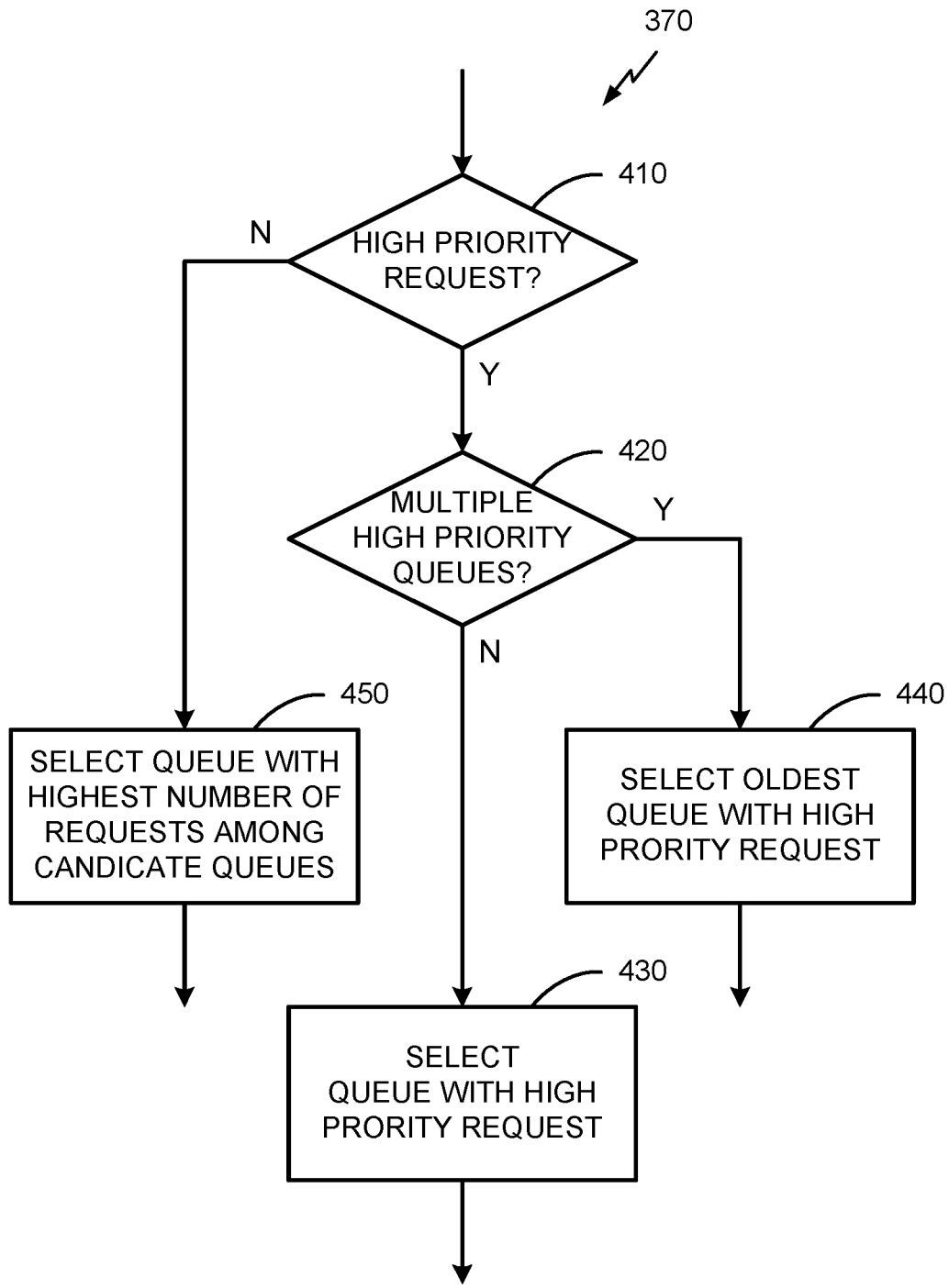
FIG. 4 illustrates a flow chart of an example process to select a queue performed by a host of an apparatus.

While the description has focused on the first request controller 220, the description also applies in a relatively straight forward manner to the second request controller 240. FIGS. 3 and 4 illustrate a flow chart of an example method 300 performed by the host 210, and in particular, by the first request controller 220 of the host 210. It should be noted that not all illustrated blocks of FIGS. 3 and 4 need to be performed, i.e., some blocks may be optional. Also, the numerical references to the blocks in FIGS. 3 and 4 should not be taken as requiring that the blocks should be performed in a certain order. Indeed, some blocks may be performed concurrently.

Even though the method 300 will be described with focus on the first host group, it will be seen that the described method 300 will be applicable in a straight forward manner to other host groups. Therefore, the term "first" will not be used when the description applies generically. The terms "first" and "second" will be used when such distinctions are helpful.

In block 310, the host 210 may be initialized. In particular, the plurality of queues 250 may be initialized for the connection 275. Recall that the connection 275 may be configured to operate in one of a plurality of communication modes, i.e., in one of N communication modes (N being an integer≥2), in which each communication mode n, n=1 . . . N is different from all other communication modes k, k=1 . . . N, k≠n. For example, each communication mode may be associated with a transfer speed that is different from transfer speeds associated with all other communication modes. The plurality of queues 250 may correspond to the communication modes applicable to the connection 275. For example, the number of queues 250 for the storage device 260 may be equal to the number of communication modes applicable to the connection 275 that couples the host 210 and the storage device 260.

In FIG. 3, there are two branches from block 310. In one branch (blocks 320-350), the request controller 220 may categorize a plurality of requests into the plurality of queues 250. In the other branch (blocks 360-390), the request controller 220 may take actions to select a queue 250, and to service the requests in the selected queue 250. This indicates that in an aspect, categorizing of the requests and servicing of the requests can take place contemporaneously.

In block 320, the request controller 220 may determine whether it has received (e.g., from the HCI 216) a request targeting the storage device 260. If so (Y branch from block 320), then in block 330, the request controller 220 may determine a communication mode of the received request. In block 340, the request controller 220 may send the request to the queue 250 corresponding to the communication mode of the request. In block 350, the request controller 220 may determine whether a finish condition is or is not met. If the finish condition is not met (N branch from block 350), then the request controller 220 may repeat blocks 320-340. In this way, the request controller 220 may fill each of the plurality of queues 250 with the requests that correspond to the communication mode of the queue 250.

The request controller 220 may also arrive at block 350 if the request controller 220 determines that it has not received the request in block 320. In block 350, an example of the finish condition may be when there are no more requests being received, e.g., from the HCI 216. Another example may be when all of the plurality of queues 250 are empty, i.e., all of the received requests have been serviced. Of course, a combination of both may be required to determine that the finish condition is met. Of course, the finish condition may encompass other requirements not specifically listed.

In block 360, request controller 220 may determine whether a queue should be selected for processing, i.e., determine whether it is a queue selection time. For example, if any of the queues 250 are non-empty, i.e., there is at least one queue 250 with one or more requests, it may be determined that the queue selection may be made. If it is determined that the queue selection may be made (Y branch from block 360), then in block 370, the request controller 220 may select one of the queues 250 as a selected queue 250-s.

FIG. 4 illustrates an example operation performed to effectuate block 370. In block 410, request controller 220 may determine whether there are high-priority requests (e.g., P2 requests) in any of the queues 250. If it is determined that there are high-priority requests (Y branch from block 410), then in block 420, the request controller 220 may determine whether there are multiple queues with high priority requests. If there is only one queue 250 with the high priority request(s) (N branch from block 420), then in block 430, the request controller 220 may select the queue 250 with the high priority request(s) as the selected queue 250-s. On the other hand, if there are multiple queues with high priority request(s) (Y branch from block 420), then in block 440, the request controller 220 may select the queue 250 that has not been served the longest among the queues 250 with the high-priority requests as the selected queue 250-*s*.

If it is determined in block 410 that there are no high-priority requests (N branch from block 410), then the process may flow to block 450, in which the request controller 220 may select the selected queue 250-*s* based on the number of requests in each of the plurality of queues 250. In an aspect, the high priority requests may be prioritized as seen in FIG. 4. That is, block 450 to select the selected queue 250-*s* based on the number of requests in each queue 250 may be performed when there are no high priority requests in any of the queues 250.

In block 450, any of the above-described processes may be implemented. For example, the queue 250 with a highest number of requests among candidate queues 250-*c* may be the selected queue 250-*s*. In one aspect, all non-empty queues 250 may be candidate queues 250-*c* at queue selection time. In this instance, the selected queue 250-*s* may be the queue 250 that has the most requests among all of the queues 250. If there are multiple queues 250 with the same highest number of requests, then a tie breaker may be applied. For example, the queue 250 that has not been served the longest among the queues 250 with the same highest number may be the selected queue 250-*s*.

But in another aspect, the candidate queues 250-*c* may be determined so as to prevent or otherwise reduce starvation. In one scenario, each non-empty queues 250 that has never been served may be a candidate queue 250-*c*. For example, a queue 250 may be filled with requests since initialization (in block 310), but also have not been served since the initialization. Such queue 250 may be a candidate queue 250-*c*. A queue 250 that has been previously served may also be a candidate queue 250-*c* if all other non-empty queues 250 have been served since the previous selection of the queue 250.

Having determined the candidate queues 250-*c*, the selected queue 250-*s* may be selected among the candidate queues 250-*c*. For example, the candidate queue 250-*c* with the highest number of requests among all candidate queues 250-*c* may be the selected queue 250-*s*. If there are multiple candidate queues 250-*c* with the same highest number of requests, then a tie breaker may be applied. For example, the candidate queue 250-*c* that has not been served the longest among the candidate queues 250-*c* with the same highest number may be the selected queue 250-*s*.

With reference back to FIG. 3, after the selected queue 250-*s* is determined, the process may flow to block 380. In block 380, the selected queue 250-*s* may be processed. In an aspect, the request controller 220 may provide the requests of the selected queue 250-*s* to the host PHY 218. The host PHY 218 in turn may transmit the provided requests to the storage device 260 over the connection 275.

Recall that blindly servicing the requests in the selected queue 250-*s* can lead to starvation. In FIG. 3, note that blocks 320-350 categorize the further requests into the plurality of queues 250 and can take place contemporaneously with the processing of the selected queue 250-*s*. This means that further requests can enter the selected queue 250-*s* even after the selection of the queue 250-*s* for service.

To prevent starvation from occurring, the request controller 220 may provide to the host PHY 218 only those requests that were within the selected queue 250-*s* at the queue selection time. More generally, the request controller 220 may refrain from providing any requests that enter the selected queue 250-*s* subsequent to the queue 250-*s* having been selected, i.e., subsequent to the queue selection time.

In block 390, the request controller 220 may determine whether a finish condition is or is not met. If the finish condition is not met (N branch from block 390), then the request controller 220 may repeat blocks 360-380. The finish condition in block 390 may be same or similar to the finish condition in block 350.

It was described above with respect to block 310 that the number of queues 250 may equal the number of communication modes applicable to the connection 275. Also recall that the connection 275 comprises a plurality of lanes 275A, 275B. In an aspect, the gear of the lane 275A may be independent of the gear of the lane 275B. In other words, the gears of the lanes 275A, 275B need not be the same. In this instance, the plurality of queues 250 may include one set of queues 250 for the lane 275A, and another set of queues 250 for the lane 275B. For each lane 275A, 275B, the number of queues 250 in the plurality of queues 250 for that lane 275A, 275B may equal the number of communication modes of the plurality of communication modes applicable to that lane 275A, 275B.

Such separation of the queues 250 may be useful when the traffic on the different lanes can be independent of each other. For example, a high speed transfer may take place over the lane 275A (between the host PHY interface 218A and the device PHY interface 268A), and simultaneously, a low speed transfer may take place over the lane 275B (between the host PHY interface 218B and the device PHY interface 268B). In such circumstances, the request controller 220 may be configured to manage the queues 250 of the host PHY interface 218A independently of the queues 250 of the host PHY interface 218B.

But in another aspect, the lanes 275A, 275B may be operated to be in the same gear. For example, the lanes 275A, 275B may not be capable of independent gearing. In another example, the lanes 275A, 275B may be capable of independent gearing, but a choice is made to operate them non-independently. In this instance, the number of queues 250 may equal the number of communication modes of the connection 275.

Recall that when the host 210 comprises multiple host groups to access multiple storage devices, each host group may comprise a host PHY (comprising one or more host PHY interfaces) and a request controller (comprising one or both of a link controller and a transport controller). Here, the terms "first" and "second" will be used for enhanced clarification. Then the plurality of queues 250 utilized for the first host group may be the plurality of first queues 250, and the plurality of requests received by the first request controller 220 may be the plurality of first requests. Then the plurality of queues 250 may also include a plurality of second queues 250 for use by the second host group, and the second request controller 240 may receive a plurality of second requests.

In FIG. 2, just as the first host group may include the first host PHY 218 (comprising the first host PHY interfaces 218A, 218B) and the first request controller 220 (comprising one or both of the first link controller 214 and the first transport controller 212), the second host group may include the second host PHY 238 (comprising the second host PHY interface 238) and the second request controller 240 (comprising one or both of the second link controller 234 and the second transport controller 232).

The second request controller 240 may be configured to perform the method illustrated in FIGS. 3 and 4 to access the second storage device 280. That is, the second request controller 240 may be configured to receive a plurality of second requests (e.g., from the second HCI 236) targeting the second storage device 280, determine a communication mode of each second request, send each second request to the second queue 250 corresponding to the communication mode of that second request, select a second queue 250-s based on a number of second requests in each second queue 250, and provide the second requests of the selected second queue 250-s to the second PHY 238 for transmission of the provided second requests to the second storage device 280 by the second PHY 238 over the second connection 295.

In an aspect, plurality of queues 250 associated with each host group may be managed independently. For example, the first request controller 220 may be configured to manage the plurality of first queues 250 (for the first storage device 260) independently of the second request controller 240 managing the plurality of second queues 250 for the second storage device 280.

Figure 5:
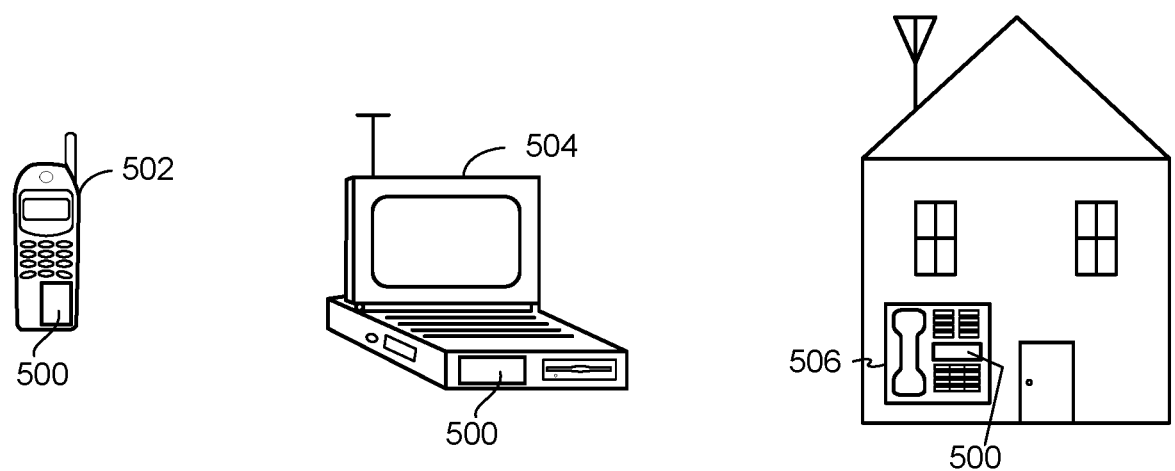
FIG. 5 illustrates examples of devices with an apparatus integrated therein.

FIG. 5 illustrates various electronic devices that may be integrated with the aforementioned apparatus illustrated in FIG. 2. For example, a mobile phone device 502, a laptop computer device 504, a terminal device 506 as well as wearable devices, portable systems, that require small form factor, extreme low profile, may include an apparatus 500 that incorporates the devices/systems as described herein. The apparatus 500 may be, for example, any of the integrated circuits, dies, integrated devices, integrated device packages, integrated circuit devices, device packages, integrated circuit (IC) packages, package-on-package devices, system-in-package devices described herein. The devices 502, 504, 506 illustrated in FIG. 5 are merely exemplary. Other electronic devices may also feature the apparatus 500 including, but not limited to, a group of devices (e.g., electronic devices) that includes mobile devices, hand-held personal communication systems (PCS) units, portable data units such as personal digital assistants, global positioning system (GPS) enabled devices, navigation devices, set top boxes, music players, video players, entertainment units, fixed location data units such as meter reading equipment, communications devices, smartphones, tablet computers, computers, wearable devices, servers, routers, electronic devices implemented in automotive vehicles (e.g., autonomous vehicles), or any other device that stores or retrieves data or computer instructions, or any combination thereof.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithms described in connection with the examples disclosed herein may be implemented as electronic hardware, computer software, or combinations of both. To clearly illustrate this interchangeability of hardware and software, various illustrative components, blocks, modules, circuits, and methods have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The methods, sequences and/or algorithms described in connection with the examples disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled with the processor such that the processor can read information from, and write information to, the storage medium. In the alternative, the storage medium may be integral to the processor.

Accordingly, an aspect can include a computer-readable media embodying any of the devices described above. Accordingly, the scope of the disclosed subject matter is not limited to illustrated examples and any means for performing the functionality described herein are included.

While the foregoing disclosure shows illustrative examples, it should be noted that various changes and modifications could be made herein without departing from the scope of the disclosed subject matter as defined by the appended claims. The functions, processes and/or actions of the method claims in accordance with the examples described herein need not be performed in any particular order. Furthermore, although elements of the disclosed subject matter may be described or claimed in the singular, the plural is contemplated unless limitation to the singular is explicitly stated.

What is claimed is:

1. An apparatus, comprising:
a host configured to access a storage device over a connection, the host comprising:
a host PHY configured to communicate with the storage device over the connection in a plurality of communication modes, each communication mode being different from all other communication modes;
a plurality of queues corresponding to the plurality of communication modes applicable to the connection; and
a request controller configured to interface with the host PHY,
wherein the request controller is configured to
receive a plurality of requests targeting the storage device,
determine a communication mode of each request,
send each request to a queue corresponding to the communication mode of that request,
select a queue based on a number of requests in each queue, and
provide the requests of the selected queue to the host PHY for transmission of the provided requests to the storage device by the host PHY over the connection.

2. The apparatus of claim 1, wherein each communication mode is associated with a transfer speed that is different from transfer speeds associated with all other communication modes.

3. The apparatus of claim 1, wherein the request controller is configured to select as the selected queue the queue with a highest number of requests.

4. The apparatus of claim 1, wherein the request controller is configured to
select as the selected queue the queue with a highest number of requests among candidate queues,
wherein a queue is a candidate queue if all other queues with requests have been served since a previous selection of the queue.

5. The apparatus of claim 4, wherein if there are two or more candidate queues with a same highest number of requests, the request controller is configured to select as the selected queue the candidate queue that has not been served the longest among the candidate queues with the same highest number of requests.

6. The apparatus of claim 1,
wherein the selected queue is selected at a queue selection time, and
wherein the request controller is configured to
provide to the host PHY the requests that were within the selected queue at the queue selection time, and
not provide to the host PHY any requests that enter the selected queue subsequent to the queue selection time.

7. The apparatus of claim 1,
wherein each request is a normal request or a high priority request, and
wherein the request controller is configured to select as the selected queue the queue with at least one high priority request.

8. The apparatus of claim 7, wherein the request controller is configured to select the selected queue based on the number of requests in each queue when there are no high priority requests in any of the queues.

9. The apparatus of claim 1, wherein a number of queues in the plurality of queues for the storage device is equal to a number of communication modes applicable to the connection.

10. The apparatus of claim 1,
wherein the host PHY comprises a plurality of host PHY interfaces configured to communicate with the storage device,
wherein the connection comprises a plurality of lanes configured to couple the plurality of host PHY interfaces with the storage device, and
wherein for each lane, a number of queues in the plurality of queues for that lane equals a number of communication modes applicable to that lane.

11. The apparatus of claim 10, wherein the request controller is configured to manage the queues for each host PHY interface independently of the queues of other host PHY interfaces.

12. The apparatus of claim 1,
wherein the host comprises:
a link controller configured to interface with the host PHY; and
a transport controller configured to interface with the link controller, and
wherein the request controller comprises one or both of the link controller and the transport controller.

13. The apparatus of claim 12,
wherein the host PHY is configured to operate in compliance with M-PHY (Mobile-PHYsical-Layer),
wherein the link controller is configured to operate in compliance with Unipro (Unified Protocol), and
wherein the transport controller is configured operate in compliance with UTP (UFS Transport Protocol).

14. The apparatus of claim 1,
wherein the storage device is a first storage device, the host PHY is a first host PHY, the connection is a first connection, the request controller is a first request controller, the plurality of queues are a plurality of first queues, and the plurality of requests are a plurality of first requests,
wherein the host further comprises:
a second PHY configured to communicate with a second storage device over a second connection in the plurality of communication modes;
a plurality of second queues corresponding to the plurality of communication modes applicable to the second connection, and
a second request controller configured to interface with the second PHY,
wherein the second request controller is configured to
receive a plurality of second requests targeting the second storage device,
determine a communication mode of each second request,
send each second request to the second queue corresponding to the communication mode of that second request,
select a second queue based on a number of second requests in each second queue, and
provide the second requests of the selected second queue to the second PHY for transmission of the provided second requests to the second storage device by the second PHY over the second connection.

15. The apparatus of claim 14, wherein the first request controller is configured to manage the plurality of first queues for the first storage device independently of the second request controller managing the plurality of second queues for the second storage device.

16. An apparatus, comprising:
a storage device;
a host; and
a connection configured to couple the storage device with the host,
wherein the host comprises:
a host PHY configured to communicate with the storage device over the connection in a plurality of communication modes, each communication mode being different from all other communication modes;
a plurality of queues corresponding to the plurality of communication modes applicable to the connection; and
a request controller configured to interface with the host PHY,
wherein the request controller is configured to
receive a plurality of requests targeting the storage device,
determine a communication mode of each request,
send each request to the queue corresponding to the communication mode of that request,
select a queue based on a number of requests in each queue, and
provide the requests of the selected queue to the host PHY for transmission of the provided requests to the storage device by the host PHY over the connection.

17. The apparatus of claim 16, wherein the request controller is configured to select as the selected queue the queue with a highest number of requests.

18. The apparatus of claim 16, wherein the request controller is configured to
select as the selected queue the queue with a highest number of requests among candidate queues,
wherein a queue is a candidate queue if all other queues with requests have been served since a previous selection of the queue.

19. The apparatus of claim 16,
wherein the selected queue is selected at a queue selection time, and wherein the request controller is configured to
provide to the host PHY the requests that were within the selected queue at the queue selection time, and
not provide to the host PHY any requests that enter the selected queue subsequent to the queue selection time.

20. The apparatus of claim 16,
wherein each request is a normal request or a high priority request,
wherein the request controller is configured to select as the selected queue the queue with at least one high priority request, and
wherein the request controller is configured to select the selected queue based on the number of requests in each queue when there are no high priority requests in any of the queues.

21. The apparatus of claim 16, wherein a number of queues in the plurality of queues for the storage device is equal to a number of communication modes applicable to the connection.

22. The apparatus of claim 16,
wherein the host PHY comprises a plurality of host PHY interfaces configured to communicate with the storage device,
wherein the connection comprises a plurality of lanes configured to couple the plurality of host PHY interfaces with a corresponding plurality of device PHY interfaces of the storage device, and
wherein for each lane, a number of queues in the plurality of queues for that lane equals a number of communication modes applicable to that lane.

23. The apparatus of claim 16,
wherein the host comprises:
a link controller configured to interface with the host PHY; and
a transport controller configured to interface with the link controller, and
wherein the request controller comprises one or both of the link controller and the transport controller.

24. The apparatus of claim 23,
wherein the host PHY is configured to operate in compliance with M-PHY (Mobile-PHYsical-Layer),
wherein the link controller is configured to operate in compliance with Unipro (Unified Protocol), and
wherein the transport controller is configured operate in compliance with UTP (UFS Transport Protocol).

25. The apparatus of claim 16,
wherein the storage device is a first storage device, the host PHY is a first host PHY, the connection is a first connection, the request controller is a first request controller, the plurality of queues are a plurality of first queues, and the plurality of requests are a plurality of first requests,
wherein the host further comprises:
a second storage device;
a second connection configured to couple the second storage device with the host,
a second PHY configured to communicate with the second storage device over the second connection in the plurality of communication modes;
a plurality of second queues corresponding to the plurality of communication modes applicable to the second connection, and
a second request controller configured to interface with the second PHY,
wherein the second request controller is configured to
receive a plurality of second requests targeting the second storage device,
for each second request, determine a communication mode of that second request, and send that second request to the second queue corresponding to the communication mode,
select a second queue based on a number of requests in each second queue, and
provide the second requests of the selected second queue to the second PHY for transmission of the provided second requests to the second storage device by the second PHY over the second connection.

26. A method of an apparatus comprising a host configured to access a storage device over a connection, the host comprising a plurality of queues corresponding to a plurality of communication modes applicable to the connection, the method comprising:
receiving, by a request controller of the host, a plurality of requests targeting the storage device;
determining, by the request controller, a communication mode of each request;
sending, by the request controller, each request to the queue corresponding to the communication mode of that request;
selecting, by the request controller, a queue based on a number of requests in each queue;
providing, by the request controller, the requests of the selected queue to a host PHY of the host for transmission of the provided requests to the storage device by the host PHY over the connection.

27. The method of claim 26, wherein each communication mode is associated with a transfer speed that is different from transfer speeds associated with all other communication modes.

28. The method of claim 26, wherein selecting the queue based on the number of requests in each queue comprises selecting as the selected queue the queue with a highest number of requests.

29. The method of claim 26,
wherein selecting the queue based on the number of requests in each queue comprises selecting as the selected queue the queue with a highest number of requests among candidate queues, and
wherein a queue is a candidate queue if all other queues with requests have been served since a previous selection of the queue.

30. The method of claim 26,
wherein the selected queue is selected at a queue selection time, and
wherein providing the requests of the selected queue to the host PHY comprises:
providing to the host PHY the requests that were within the selected queue at the queue selection time; and
not providing to the host PHY any requests that enter the selected queue subsequent to the queue selection time.

31. The method of claim 26,
wherein each request is a normal request or a high priority request, and
wherein the method further comprises selecting as the selected queue the queue with at least one high priority request.

32. The method claim 31, wherein selecting the queue based on the number of requests in each queue takes place when there are no high priority requests in any of the queues.

33. The method of claim 26, wherein a number of queues in the plurality of queues for the storage device is equal to a number of communication modes of the plurality of communication modes applicable to the connection.

34. The method of claim 26,
wherein the host PHY comprises a plurality of host PHY interfaces configured to communicate with the storage device,
wherein the connection comprises a plurality of lanes configured to couple the plurality of host PHY interfaces with the storage device, and
wherein for each lane, a number of queues in the plurality of queues for that lane equals a number of communication modes of the plurality of communication modes applicable to that lane.

35. An apparatus, comprising:
a host configured to access a storage device over a connection, the host comprising:
  a host PHY configured to communicate with the storage device over the connection in a plurality of communication modes, each communication mode being different from all other communication modes;
  a plurality of queues corresponding to plurality of communication modes applicable to the connection; and
  a request controller configured to interface with the host PHY,
wherein the request controller comprises:
  means for receiving a plurality of requests targeting the storage device;
  means for determining a communication mode of each request;
  means for sending each request to the queue corresponding to the communication mode of that request;
  means for selecting a queue based on a number of requests in each queue; and
  means for providing the requests of the selected queue to the host PHY for transmission of the provided requests to the storage device by the host PHY over the connection.

36. The apparatus of claim 1, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

37. The apparatus of claim 16, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

38. The apparatus of claim 35, wherein the apparatus is incorporated into a device selected from a group consisting of a music player, a video player, an entertainment unit, a navigation device, a communications device, a mobile device, a mobile phone, a smartphone, a personal digital assistant, a fixed location terminal, a tablet computer, a computer, a wearable device, a laptop computer, a server, and a device in an automotive vehicle.

* * * * *